US012700924B2

(12) United States Patent
Sakamoto et al.

(10) Patent No.: US 12,700,924 B2
(45) Date of Patent: Aug. 4, 2026

(54) COMMUNICATION METHOD, OPTICAL RECEIVING APPARATUS, OPTICAL TRANSMITTING APPARATUS, AND COMMUNICATION SYSTEM

(71) Applicant: NTT, Inc., Tokyo (JP)

(72) Inventors: Kazumitsu Sakamoto, Musashino (JP); Takeshi Kinoshita, Musashino (JP); Takuya Ohara, Musashino (JP); Etsushi Yamazaki, Musashino (JP)

(73) Assignee: NTT, Inc., Tokyo (JP)

( * ) Notice: Subject to any disclaimer, the term of this patent is extended or adjusted under 35 U.S.C. 154(b) by 250 days.

(21) Appl. No.: 18/717,582

(22) PCT Filed: Dec. 24, 2021

(86) PCT No.: PCT/JP2021/048155
§ 371 (c)(1),
(2) Date: Jun. 7, 2024

(87) PCT Pub. No.: WO2023/119615
PCT Pub. Date: Jun. 29, 2023

(65) Prior Publication Data
US 2025/0070871 A1 Feb. 27, 2025

(51) Int. Cl.
*H04B 10/00* (2013.01)
*H04B 10/112* (2013.01)
(Continued)

(52) U.S. Cl.
CPC ....... *H04B 10/112* (2013.01); *H04B 10/6165* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

2005/0135815 A1* 6/2005 Gerwe .................. H01S 3/2383
398/188
2015/0349888 A1* 12/2015 Chen .................. H04B 10/1121
398/130
2022/0303009 A1* 9/2022 Boroson ............... H04L 1/1835

OTHER PUBLICATIONS

Yongxiong Ren et al., "Adaptive-optics-based simultaneous pre- and post-turbulence compensation of multiple orbital-angular-momentum beams in a bidirectional free-space optical link", Optica, vol. 1, No. 6, Dec. 2014, pp. 376-382.

* cited by examiner

*Primary Examiner* — Daniel G Dobson
(74) *Attorney, Agent, or Firm* — Harness, Dickey & Pierce, P.L.C.

(57) ABSTRACT

A communication method in a communication system including an optical transmission device and an optical reception device includes: detecting wave-front distortions of a reference optical signal used for wave-front observation which arrives at a first time point and a second time point before a compensation start time point at which compensation for wave-front distortion is performed, by a plurality of sensors; estimating spatial phase distributions of a plurality of atmospheric layers between the optical transmission device and the optical reception device, respectively, at the first time point and the second time point, based on the wave-front distortions detected by the plurality of sensors, respectively; predicting the respective spatial phase distributions of the plurality of atmospheric layers at the compensation start time point by using estimation results of the respective spatial phase distributions of the plurality of atmospheric layers estimated at the first time point and the second time point; controlling, based on the predicted results, an operation performed by a wave-front control device that compensates for a wave-front distortion of an optical signal; and receiving the wave-front distortion of the (Continued)

INDIVIDUAL LAYERS CHANGE
WITH DIFFERENT WIND SPEEDS AND DIRECTIONS

ATMOSPHERIC LAYER 1    ATMOSPHERIC LAYER 2

OPTICAL TRANSMISSION DEVICE

OPTICAL RECEPTION DEVICE
SENSOR $\phi\_atm1$    $\phi\_atm2$

OBSERVED WAVE-FRONT $\phi = \phi\_atm1 + \phi\_atm2$ optical signal transmitted from the optical transmission device after the wave-front control device compensates for the wave-front distortion.

6 Claims, 14 Drawing Sheets

(51) Int. Cl.
  *H04B 10/61* (2013.01)
  *H04J 14/00* (2006.01)
(58) Field of Classification Search
  CPC ............ H04B 10/1127; H04B 10/1129; H04B 10/114; H04B 10/1141; H04B 10/1143; H04B 10/1149; H04B 10/116; H04B 10/118; H04B 10/2507
  See application file for complete search history.

Fig. 3

OPTICAL TRANSMISSION DEVICE

Fig. 8

OPTICAL RECEPTION DEVICE

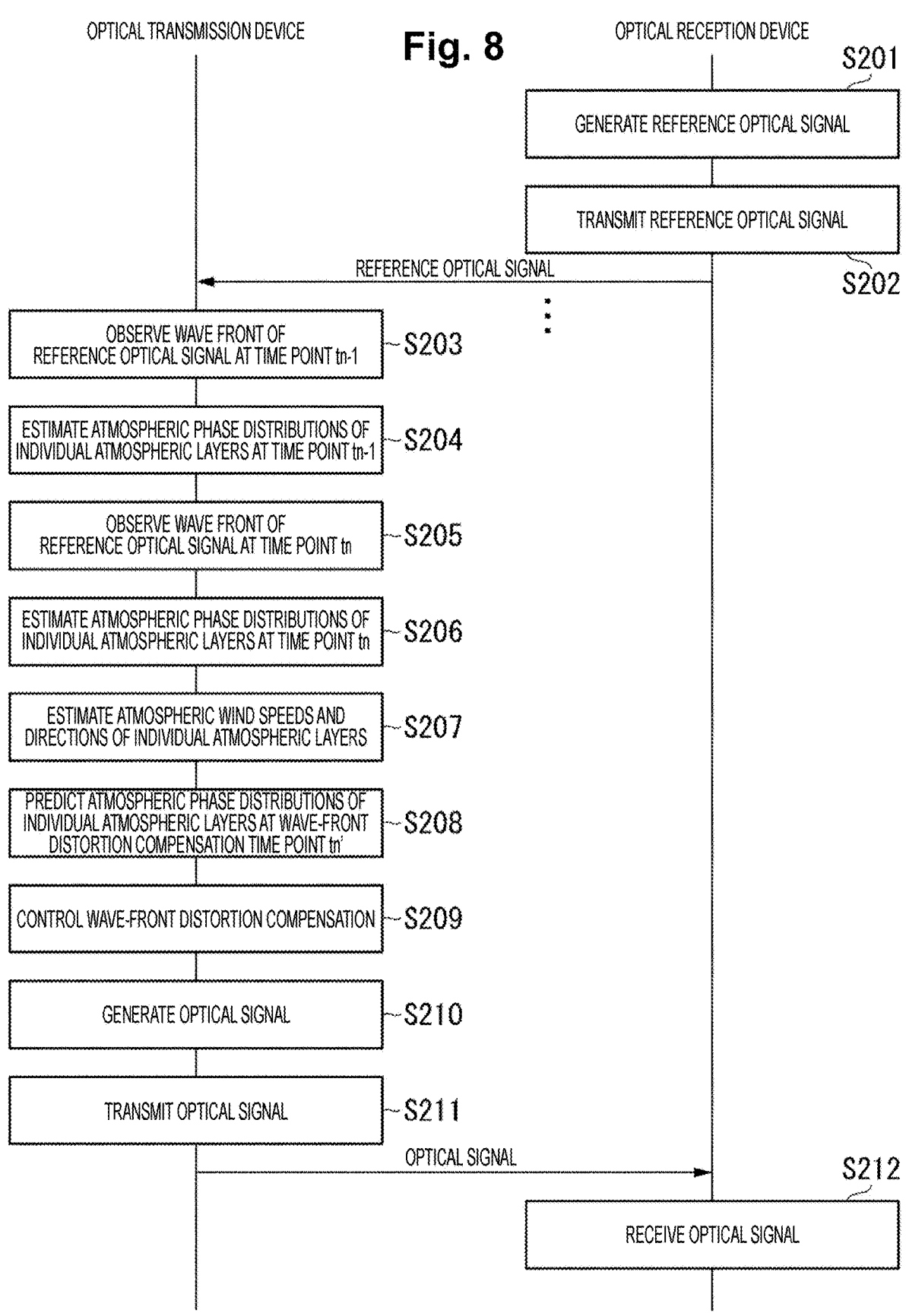

S201

GENERATE REFERENCE OPTICAL SIGNAL

TRANSMIT REFERENCE OPTICAL SIGNAL

S202

REFERENCE OPTICAL SIGNAL

OBSERVE WAVE FRONT OF REFERENCE OPTICAL SIGNAL AT TIME POINT $t_{n-1}$  ~S203

ESTIMATE ATMOSPHERIC PHASE DISTRIBUTIONS OF INDIVIDUAL ATMOSPHERIC LAYERS AT TIME POINT $t_{n-1}$  ~S204

OBSERVE WAVE FRONT OF REFERENCE OPTICAL SIGNAL AT TIME POINT $t_n$  ~S205

ESTIMATE ATMOSPHERIC PHASE DISTRIBUTIONS OF INDIVIDUAL ATMOSPHERIC LAYERS AT TIME POINT $t_n$  ~S206

ESTIMATE ATMOSPHERIC WIND SPEEDS AND DIRECTIONS OF INDIVIDUAL ATMOSPHERIC LAYERS  ~S207

PREDICT ATMOSPHERIC PHASE DISTRIBUTIONS OF INDIVIDUAL ATMOSPHERIC LAYERS AT WAVE-FRONT DISTORTION COMPENSATION TIME POINT $t_n'$  ~S208

CONTROL WAVE-FRONT DISTORTION COMPENSATION  ~S209

GENERATE OPTICAL SIGNAL  ~S210

TRANSMIT OPTICAL SIGNAL  ~S211

OPTICAL SIGNAL

S212

RECEIVE OPTICAL SIGNAL

COMMUNICATION METHOD, OPTICAL RECEIVING APPARATUS, OPTICAL TRANSMITTING APPARATUS, AND COMMUNICATION SYSTEM

CROSS-REFERENCE TO RELATED APPLICATIONS

This application is a 371 U.S. National Phase of International Application No. PCT/JP2021/048155, filed on Dec. 24, 2021. The entire disclosure of the above application is incorporated herein by reference.

TECHNICAL FIELD

The present invention relates to a communication method, an optical reception device, an optical transmission device, and a communication system.

BACKGROUND ART

Optical wireless communication between a transmitter and a receiver may be performed using an optical signal that is propagated in the atmosphere. In this case, a wave front of the optical signal is distorted due to an influence of the atmosphere. As a result, spatial intensity (speckle) occurs in the optical signal arriving at the receiver. This intensity pattern varies with time depending on atmospheric fluctuations. This intensity pattern is a major hindrance in achieving stable optical wireless communication.

For the purpose of suppressing an influence of the atmospheric fluctuations, adaptive optics for compensating for a wave-front distortion of an optical signal through closed-loop control has been studied (see Non Patent Literature 1). In the adaptive optics, a receiver observes the influence of the fluctuations received from the atmosphere in the optical signal transmitted from the transmitter (counterpart station). That is, the receiver observes the wave-front distortion (spatial phase distribution) of the incoming optical signal. The receiver derives a compensation pattern of the wave-front distortion based on an observation result. A wave-front control device provided in the receiver forms a compensation pattern for the wave-front distortion at a wave front affected by the fluctuations. This results in improvement in quality of optical wireless communication.

CITATION LIST

Non Patent Literature

Non Patent Literature 1: Yongxiong Ren, Guodong Xie, Hao Huang, Nisar Ahmed, Yan Yan, Long Li, Changjing Bao, Martin P. J. Lavery, Moshe Tur, Mark A. Neifeld, Robert W. Boyd, Jeffrey H. Shapiro, and Alan E. Willner, "Adaptive-optics-based simultaneous pre- and post-turbulence compensation of multiple orbital-angular-momentum beams in a bidirectional free-space optical link", Optica 1, 376-382 (2014)

SUMMARY OF INVENTION

Technical Problem

In a case where wave-front distortion compensation is performed by the adaptive optics described in Non Patent Literature 1, a problem arises in that it is not possible to follow variations in atmospheric fluctuations due to a control delay from wave-front observation to formation of a wave-front distortion compensation pattern by a wave-front control device, and performance of the wave-front distortion compensation deteriorates.

In view of the above circumstances, an object of the present invention is to provide a technology capable of improving accuracy of compensation for a wave-front distortion of an optical signal propagated in the atmosphere.

Solution to Problem

According to one aspect of the present invention, there is provided a communication method in a communication system including an optical transmission device and an optical reception device, the communication method including: detecting wave-front distortions of a reference optical signal used for wave-front observation which arrives at a first time point and a second time point before a compensation start time point at which compensation for wave-front distortion is performed, by a plurality of sensors; estimating spatial phase distributions of a plurality of atmospheric layers between the optical transmission device and the optical reception device, respectively, at the first time point and the second time point, based on the wave-front distortions detected by the plurality of sensors, respectively; predicting the respective spatial phase distributions of the plurality of atmospheric layers at the compensation start time point by using estimation results of the respective spatial phase distributions of the plurality of atmospheric layers estimated at the first time point and the second time point; controlling, based on the predicted results, an operation performed by a wave-front control device that compensates for a wave-front distortion of an optical signal; and receiving the wave-front distortion of the optical signal transmitted from the optical transmission device after the wave-front control device compensates for the wave-front distortion.

According to another aspect of the present invention, there is provided an optical reception device in a communication system including an optical transmission device and the optical reception device, the optical reception device including: a plurality of sensors that detect wave-front distortions of a reference optical signal used for wave-front observation which arrives at a first time point and a second time point before a compensation start time point at which compensation for wave-front distortion is performed; a phase distribution predicting unit that estimates spatial phase distributions of a plurality of atmospheric layers between the optical transmission device and the optical reception device, respectively, at a first time point and a second time point, based on the respective wave-front distortions detected by the plurality of sensors, and predicts the respective spatial phase distributions of the plurality of atmospheric layers at the compensation start time point by using an estimation result of the respective spatial phase distributions of the plurality of atmospheric layers estimated at the first time point and second time point; a wave-front control device that compensates for a wave-front distortion of an optical signal transmitted from the optical transmission device; a control unit that controls an operation performed by the wave-front control device, based on a predicted result; and an optical reception unit that receives an optical signal obtained by performing compensation for a wave-front distortion of the optical signal by the wave-front control device.

According to still another aspect of the present invention, there is provided an optical transmission device in a communication system including the optical transmission device and an optical reception device, the optical transmission device including: a plurality of sensors that detect wave-front distortions of a reference optical signal used for wave-front observation which arrives at a first time point and a second time point before a compensation start time point at which compensation for wave-front distortion is performed; a phase distribution predicting unit that estimates spatial phase distributions of a plurality of atmospheric layers between the optical transmission device and the optical reception device, respectively, at a first time point and a second time point, based on the respective wave-front distortions detected by the plurality of sensors, and predicts the respective spatial phase distributions of the plurality of atmospheric layers at the compensation start time point by using an estimation result of the respective spatial phase distributions of the plurality of atmospheric layers estimated at the first time point and second time point; a wave-front control device that compensates for a wave-front distortion of an optical signal depending on data to be transmitted; a control unit that controls an operation performed by the wave-front control device, based on a predicted result; and an optical transmission unit that transmits an optical signal obtained by performing compensation for a wave-front distortion via the wave-front control device to the optical reception device.

According to still another aspect of the present invention, there is provided a communication system including: an optical transmission device; and an optical reception device. The optical transmission device includes an optical transmission unit that transmits, to the optical reception device, an optical signal depending on data to be transmitted and a reference optical signal used for wave-front observation. The optical reception device includes a plurality of sensors that detect wave-front distortions of the reference optical signal which arrives at a first time point and a second time point before a compensation start time point at which compensation for wave-front distortion is performed, a phase distribution predicting unit that estimates spatial phase distributions of a plurality of atmospheric layers between the optical transmission device and the optical reception device, respectively, at a first time point and a second time point, based on the respective wave-front distortions detected by the plurality of sensors, and predicts the respective spatial phase distributions of the plurality of atmospheric layers at the compensation start time point by using an estimation result of the respective spatial phase distributions of the plurality of atmospheric layers estimated at the first time point and second time point, a wave-front control device that compensates for a wave-front distortion of the optical signal, a control unit that controls an operation performed by the wave-front control device, based on a predicted result, and an optical reception unit that receives an optical signal obtained by performing compensation for a wave-front distortion of the optical signal by the wave-front control device.

According to still another aspect of the present invention, there is provided a communication system including: an optical transmission device; and an optical reception device. The optical transmission device includes a plurality of sensors that detect wave-front distortions of a reference optical signal used for wave-front observation which arrives at a first time point and a second time point before a compensation start time point at which compensation for wave-front distortion is performed, a phase distribution predicting unit that estimates spatial phase distributions of a plurality of atmospheric layers between the optical transmission device and the optical reception device, respectively, at a first time point and a second time point, based on the respective wave-front distortions detected by the plurality of sensors, and predicts the respective spatial phase distributions of the plurality of atmospheric layers at the compensation start time point by using an estimation result of the respective spatial phase distributions of the plurality of atmospheric layers estimated at the first time point and second time point, a wave-front control device that compensates for a wave-front distortion of an optical signal depending on data to be transmitted, a control unit that controls an operation performed by the wave-front control device, based on a predicted result, and an optical transmission unit that transmits an optical signal obtained by performing compensation for a wave-front distortion via the wave-front control device to the optical reception device. The optical reception device includes an optical transmission unit that transmits the reference optical signal to the optical transmission device, and an optical reception unit that receives an optical signal obtained by performing compensation for a wave-front distortion of the optical signal by the wave-front control device.

Advantageous Effects of Invention

According to the present invention, it is possible to improve accuracy of compensation for a wave-front distortion of an optical signal propagated in the atmosphere.

BRIEF DESCRIPTION OF DRAWINGS

FIG. 3 is a diagram illustrating a configuration example of a communication system according to a first embodiment.

FIG. 8 is a sequence diagram illustrating a flow of processing of the communication system according to the second embodiment.

DESCRIPTION OF EMBODIMENTS

Hereinafter, an embodiment of the present invention will be described with reference to the drawings.

(Outline)

Figure 1:
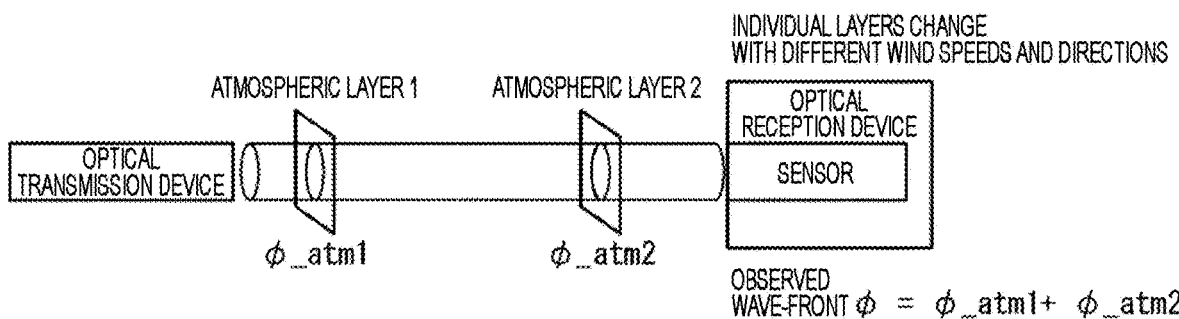
FIG. 1 is a diagram for illustrating an outline of the present invention.

First, an outline of the present invention will be described with reference to FIGS. 1 and 2. As illustrated in FIG. 1, the atmosphere between an optical transmission device and an optical reception device is described as superposition of a plurality of atmospheric layers (in FIG. 1, an atmospheric layer 1 and an atmospheric layer 2). Here, a phase distribution of the atmosphere in the atmospheric layer 1 is denoted by $\phi\_atm1$, and a phase distribution of the atmosphere in the atmospheric layer 2 is denoted by $\phi\_atm2$. Here, the phase distribution of the atmosphere represents a wave-front distortion (spatial phase distribution) received by light passing through the atmosphere. If a wind speed and a wind direction of each atmospheric layer can be estimated, it is possible to predict an influence of atmospheric fluctuations after control delay in the optical reception device and form an appropriate wave-front distortion compensation pattern.

However, a wave front (spatial phase distribution) observed by a sensor included in the optical reception device is a result of superposition of phase distributions of the plurality of atmospheric layers. Therefore, it is necessary to estimate the wind speed and the wind direction separately for each atmospheric layer from the wave front (spatial phase distribution) observed by the sensor. The sensor included in the optical reception device is, for example, a wave-front sensor.

Figure 2:
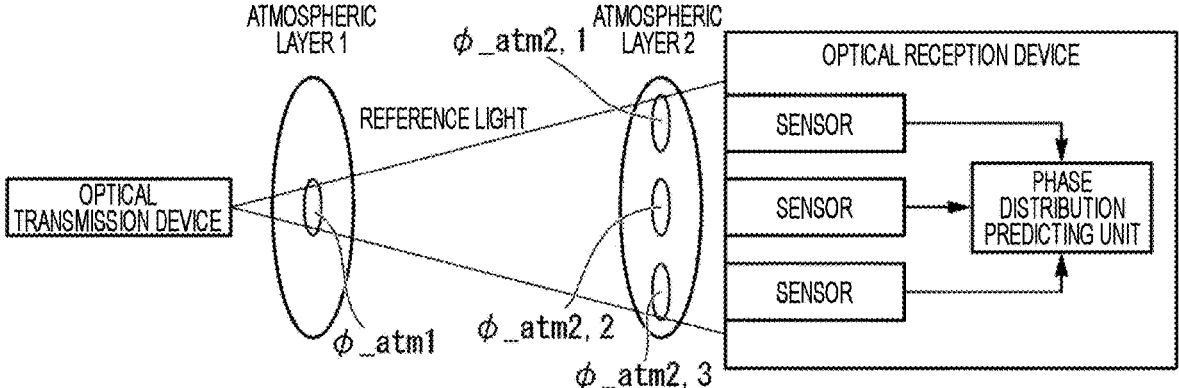
FIG. 2 is a diagram for illustrating an outline of the present invention.

In the present invention, as illustrated in FIG. 2 as an example, a reference optical signal having a wavelength different from that of an optical signal for data transmission (hereinafter, simply referred to as an "optical signal") is transmitted from the optical transmission device, and the reference optical signal is received by a plurality of sensors (for example, three sensors) in the optical reception device. The reference optical signal is a signal used for wave-front observation, has a beam diameter larger than that of the optical signal, and is received by each sensor. Each sensor detects a wave-front distortion of the reference optical signal by observing a wave front (spatial phase distribution) of the reference optical signal.

The phase distribution predicting unit included in the optical reception device estimates a phase distribution of a first layer (atmospheric layer 1) and a phase distribution of a second layer (atmospheric layer 2) on the basis of the wave-front distortion of the reference optical signal detected by each sensor. The phase distribution predicting unit executes processing thereof at time points tn-1 (first time point) and tn (second time point) which are time points before a wave-front distortion compensation time point (compensation start time point) tn' and estimates atmospheric wind speeds and wind directions of individual atmospheric layers through correlation calculation of phase distribution estimation values at the time points tn-1 and tn. The wave-front distortion compensation time point tn' is a time point at which compensation for the wave-front distortion is performed.

Accordingly, the phase distribution predicting unit predicts the phase distribution of the atmosphere in each atmospheric layer at the wave-front distortion compensation time point tn' on the basis of estimation results of the wind speed and the wind direction and causes a wave-front control device to form a wave-front distortion compensation pattern that compensates for the phase distribution. As described above, since control of the wave-front control device is performed at a time point before the wave-front distortion compensation time point tn', a control delay can be suppressed at the wave-front distortion compensation time point tn', and variations in atmospheric fluctuations can be followed. Hence, accuracy of compensation for the wave-front distortion of the optical signal propagated in the atmosphere can be improved.

Hereinafter, specific configurations for achieving the above-described processing will be described.

First Embodiment

Figure 3:
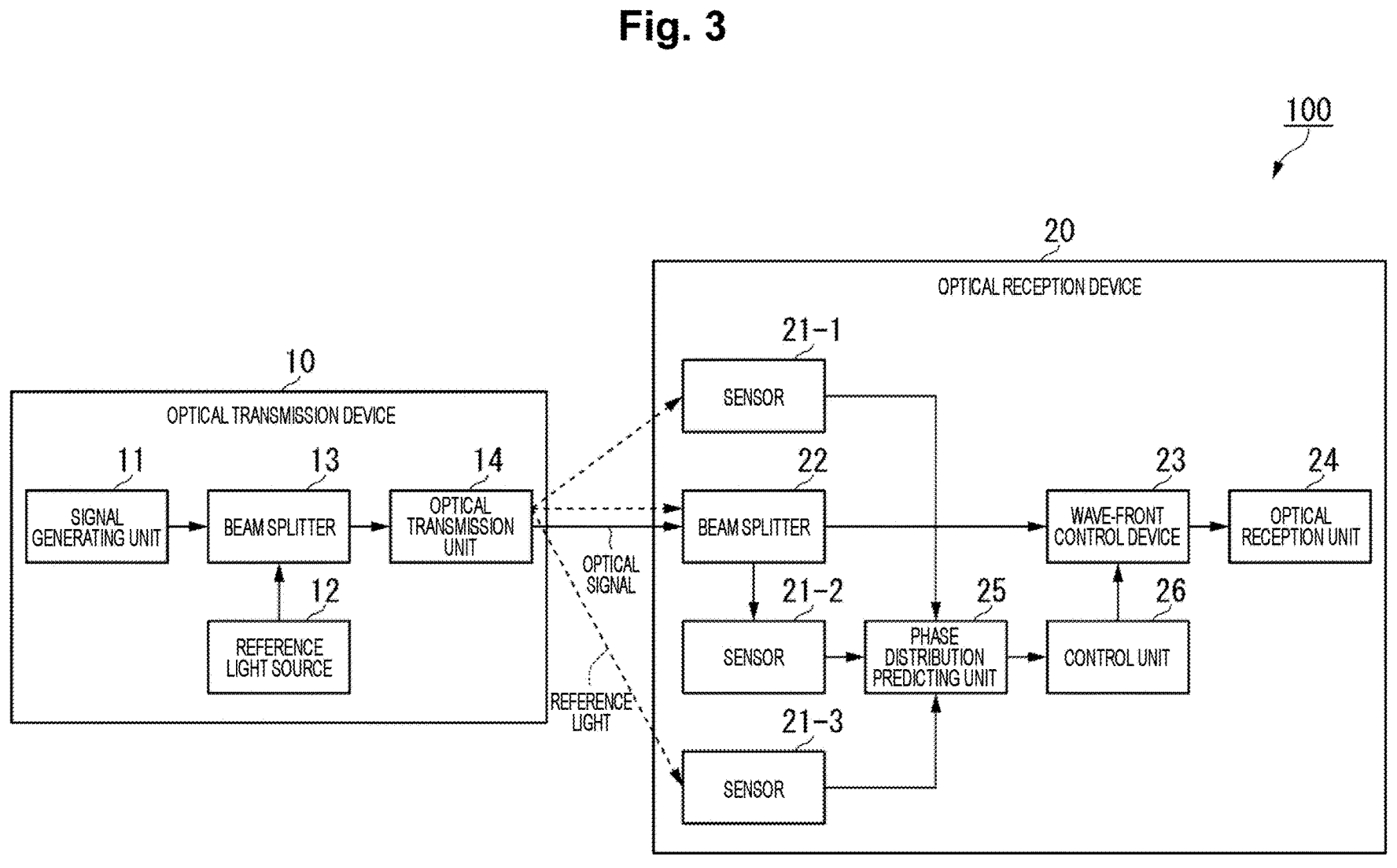

FIG. 3 is a diagram illustrating a configuration example of a communication system 100 according to the first embodiment. The communication system 100 is an optical communication system that executes wireless communication (optical wireless communication) using an optical signal. The communication system 100 includes one or more optical transmission devices 10 and one or more optical reception devices 20. In the communication system 100, the optical signal propagates in the atmosphere between the optical transmission device 10 and the optical reception device 20. In the first embodiment, the optical reception device 20 compensates for a distortion generated at a wave front of the optical signal propagated in the atmosphere by adaptive optics. Moreover, in the first embodiment, it is assumed that there are two atmospheric layers between the optical transmission device 10 and the optical reception device 20.

The optical transmission device 10 includes a signal generating unit 11, a reference light source 12, a beam splitter 13, and an optical transmission unit 14.

The signal generating unit 11 generates an optical signal depending on data to be transmitted.

The reference light source 12 outputs a reference optical signal having a predetermined wavelength used for wave-front observation. The predetermined wavelength is a wavelength different from a wavelength of the optical signal generated by the signal generating unit 11.

The beam splitter 13 outputs the reference optical signal output from the reference light source 12 to the optical transmission unit 14 such that the reference optical signal has the same optical axis as that of the optical signal generated by the signal generating unit 11.

The optical transmission unit 14 transmits the reference optical signal and the optical signal output from the beam splitter 13. Moreover, the optical transmission unit 14 transmits the reference optical signal having a beam diameter larger than that of the optical signal. The beam diameter larger than that of the optical signal is desirably a size to the extent that the reference optical signal can be received by at least a plurality of sensors included in the optical reception device 20.

The optical reception device 20 includes a plurality of sensors 21-1 to 21-3, a beam splitter 22, a wave-front control device 23, an optical reception unit (optical receiver) 24, a phase distribution predicting unit (phase distribution predictor) 25, a control unit (controller) 26, and a reference light source 27.

The sensors 21-1 to 21-3 are wave-front sensors. The sensors 21-1 to 21-3 are arranged at different positions and detect wave-front distortions of an incoming reference optical signal by observing a wave front (spatial phase distribution) of the reference optical signal. The sensors 21-1 to 21-3 output signals indicating the wave-front distortions of the reference optical signal to the phase distribution predicting unit 25.

The wave-front control device 23 compensates for a wave-front distortion of the optical signal depending on data to be transmitted. The wave-front control device 23 is, for example, a spatial optical phase modulator or a deformable mirror. In the following description, it is assumed that the wave-front control device 23 is a spatial optical phase modulator as an example. The wave-front control device 23 modulates a phase of the wave front of the input optical signal (including the reference optical signal). Under the control of the control unit 26, the wave-front control device 23 forms a wave-front distortion compensation pattern for compensating for the wave-front distortion of the input optical signal and compensates for the wave-front distortion by modulating the phase of the wave front of the optical signal.

The beam splitter 22 splits the optical signal (including the reference optical signal) obtained by modulating the phase of the wave front thereof by the wave-front control device 23 into signals to the optical reception unit 24 and the sensor 21-2.

The optical reception unit 24 converts an optical signal into an electrical signal. The optical reception unit 24 performs predetermined signal processing (for example, demodulation processing) on the converted electrical signal. The optical reception unit 24 acquires, from an electrical signal through the predetermined signal processing, data transmitted from the optical transmission device 10 using an optical signal.

The phase distribution predicting unit 25 predicts the phase distribution of the atmosphere in the individual atmospheric layers (the atmospheric layer 1 and the atmospheric layer 2) at the wave-front distortion compensation time point tn' on the basis of signals indicating the wave-front distortions of the reference optical signals obtained from the sensors 21-1 to 21-3, respectively. The phase distribution predicting unit 25 outputs prediction results of the phase distributions of the atmosphere in the individual atmospheric layers (the atmospheric layer 1 and the atmospheric layer 2) at the wave-front distortion compensation time point tn' to the control unit 26.

The control unit 26 derives a wave-front distortion pattern for compensating for the phase distribution included in the prediction results on the basis of the prediction results output from the phase distribution predicting unit 25. The control unit 26 controls an operation of phase modulation by the wave-front control device 23 depending on the derived wave-front distortion pattern.

Figure 4:
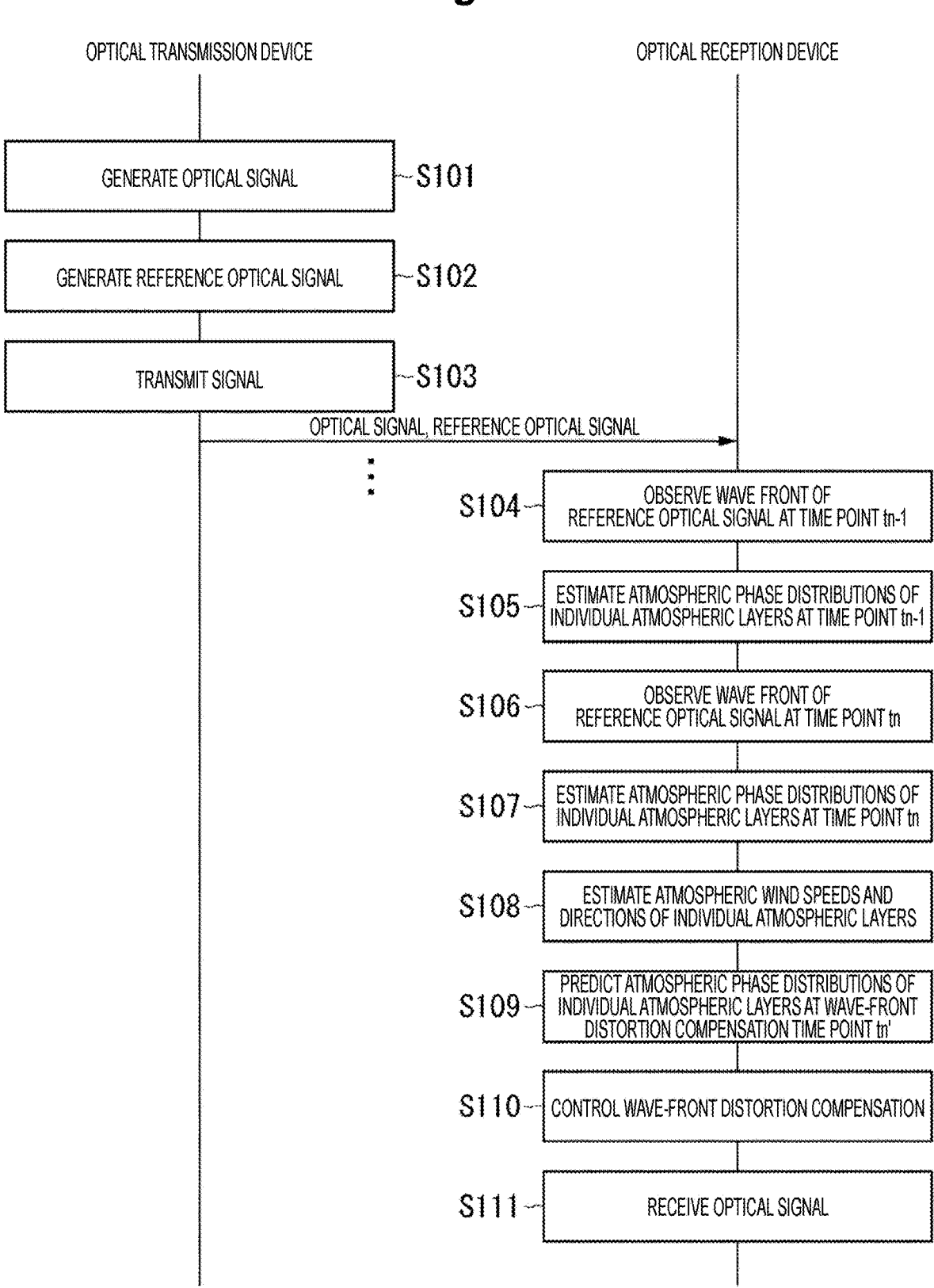
FIG. 4 is a sequence diagram illustrating a flow of processing of the communication system according to the first embodiment.

FIG. 4 is a sequence diagram illustrating a flow of processing of the communication system 100 according to the first embodiment. Moreover, it is assumed that the wave-front control device 23 does not perform phase adjustment by the control unit 26 at the start of the processing in FIG. 4.

The signal generating unit 11 of the optical transmission device 10 generates an optical signal (Step S101). The signal generating unit 11 outputs the generated optical signal to the beam splitter 13. The reference light source 12 generates a reference optical signal having a wavelength different from a wavelength of the optical signal generated by the signal generating unit 11 (Step S102). The reference light source 12 outputs the generated reference optical signal to the beam splitter 13.

The optical signal generated by the signal generating unit 11 and the reference optical signal generated by the reference light source 12 are input to the optical transmission unit 14 via the beam splitter 13. The optical transmission unit 14 transmits the optical signal and the reference optical signal to the optical reception device 20 (Step S103). Moreover, the optical transmission device 10 continually transmits optical signals and reference optical signals to the optical reception device 20. The reference optical signals transmitted from the optical transmission device 10 are received by the individual sensors 21-1 to 21-3 of the optical reception device 20. Moreover, the sensor 21-2 receives the reference optical signal via the wave-front control device 23 and the beam splitter 22.

Each of the sensors 21-1 to 21-3 observes the wave front (spatial phase distribution) of the reference optical signal at the time point tn-1 (Step S104). Consequently, each of the sensors 21-1 to 21-3 detects a wave-front distortion of the reference optical signal at the time point tn−1. Here, phase distributions φ1(x, y), φ2(x, y), and φ3(x, y) observed by the respective sensors 21-1 to 21-3 are expressed by the following Expression (1). Here, it is assumed that a direction from the optical transmission device 10 to the optical reception device 20 is a z axis, and a plane perpendicular to the z axis is an xy plane. In this case, (x, y) in φ1(x, y) described above represents a description for supplementarily indicating that φ1 does not represent a value of a single phase but represents a phase distribution in the xy plane. In addition, the same is true of (x, y) in φ2(x, y) and φ3(x, y), and φ1 may be replaced with φ2 or φ3 in the above description. The phase distribution φ1(x, y) represents a phase distribution observed by the sensor 21-1, the phase distribution φ2(x, y) represents a phase distribution observed by the sensor 21-2, and the phase distribution φ3(x, y) represents a phase distribution observed by the sensor 21-3.

[Math. 1]

$$\phi1(x, y) = \phi\_atm1(x, y) + \phi\_atm2, 1(x, y) + n1(x, y) \qquad \text{Expression (1)}$$

$$\phi2(x, y) = \phi\_atm1(x, y) + \phi\_atm2, 2(x, y) + n2(x, y)$$

$$\phi3(x, y) = \phi\_atm1(x, y) + \phi\_atm2, 3(x, y) + n3(x, y)$$

In Expression (1), φ_atm1(x, y) represents a phase distribution of the atmospheric layer 1 (first layer) passing through a path from the optical transmission device 10 to the optical reception device 20, φ_atm2,1(x, y) represents a phase distribution of the atmospheric layer 2 (second layer) passing through a path from the optical transmission device 10 to the sensor 21-1 of the optical reception device 20, φ_atm2,2(x, y) represents a phase distribution of the atmospheric layer 2 (second layer) passing through a path from the optical transmission device 10 to the sensor 21-2 of the optical reception device 20, and φ_atm2,3(x, y) represents a phase distribution of the atmospheric layer 2 (second layer) passing through a path from the optical transmission device 10 to the sensor 21-3 of the optical reception device 20. Further, ni(x, y) (i is an integer of 1 or more) in Expression (1) represents a wave-front observation error in each of the sensors 21-1 to 21-3.

Each of the sensors 21-1 to 21-3 outputs a signal indicating a wave-front distortion of the reference optical signal to the phase distribution predicting unit 25. The phase distribution predicting unit 25 estimates atmospheric phase distributions of the individual atmospheric layers at the time point tn-1 on the basis of the signals indicating the wave-front distortions of the reference optical signals obtained from the individual sensors 21-1 to 21-3 (Step S105). First, the phase distribution predicting unit 25 estimates a phase distribution $\phi\_atm1'(x, y)$ of the first layer at the time point tn−1 on the basis of the following Expression (2).

[Math. 2]

$$\phi\_atm1'(x, y) = \{\phi1(x, y) + \phi2(x, y) + \phi3(x, y)\}/3 \qquad \text{Expression (2)}$$

Since the phase distribution $\phi\_atm1'(x, y)$ of the first layer is common to individual transmission and reception paths as illustrated in FIG. 2, the phase distribution can be estimated by obtaining an average of $\phi1(x, y)$, $\phi2(x, y)$, and $\phi3(x, y)$.

Next, the phase distribution predicting unit 25 estimates phase distributions $\phi\_atm2,1'(x, y)$, $\phi\_atm2,2'(x, y)$, and $\phi\_atm2,3'(x, y)$ of the second layer at time point tn−1 on the basis of the following Expression (3).

[Math. 3]

$$\phi\_atm2, 1'(x, y) = \phi1(x, y) - \phi\_atm1'(x, y) \qquad \text{Expression (3)}$$

$$\phi\_atm2, 2'(x, y) = \phi2(x, y) - \phi\_atm1'(x, y)$$

$$\phi\_atm2, 3'(x, y) = \phi3(x, y) - \phi\_atm1'(x, y)$$

As described in Expression (3), the phase distributions $\phi\_atm2,1'(x, y)$, $\phi\_atm2,2'(x, y)$, and $\phi\_atm2,3'(x, y)$ of the second layer can be estimated by subtracting an estimated value of the phase distribution of the first layer from the phase distributions observed by the individual sensors 21-1 to 21-3.

Thereafter, each of the sensors 21-1 to 21-3 observes a wave front (spatial phase distribution) of the reference optical signal at the time point tn (Step S106). Consequently, each of the sensors 21-1 to 21-3 detects a wave-front distortion of the reference optical signal at the time point tn. Each of the sensors 21-1 to 21-3 outputs a signal indicating a wave-front distortion of the reference optical signal to the phase distribution predicting unit 25.

The phase distribution predicting unit 25 estimates atmospheric phase distributions of the individual atmospheric layers at the time point tn on the basis of the signals indicating the wave-front distortions of the reference optical signals obtained from the individual sensors 21-1 to 21-3 (Step S107). A method of deriving the atmospheric phase distribution of the individual atmospheric layers at the time point tn is similar to that in Step S105. Consequently, the phase distribution predicting unit 25 can obtain estimated values (hereinafter, referred to as "time-point tn−1 estimated values") of the atmospheric phase distributions of the individual atmospheric layers at the time point tn−1 and estimated values (hereinafter, referred to as "time-point tn estimated values") of the atmospheric phase distributions of the individual atmospheric layers at the time point tn.

The phase distribution predicting unit 25 estimates atmospheric wind speeds and wind directions of the individual atmospheric layers through correlation calculation between the time-point tn−1 estimated values and the time-point tn estimated values (Step S108). Specifically, the phase distribution predicting unit 25 estimates the atmospheric wind speeds and the wind directions of the individual atmospheric layers by calculating a correlation to a two-dimensional phase-distribution estimated values on the xy plane at two time points (time point tn−1 and time point tn). Consequently, the phase distribution predicting unit 25 estimates a direction and a speed with which the atmosphere is moving between the time point tn−1 and the time point tn for each atmospheric layer, using the time-point tn−1 estimated value and the time-point tn estimated value. Accordingly, the phase distribution predicting unit 25 predicts the atmospheric phase distributions of the individual atmospheric layers at the wave-front distortion compensation time point tn' on the basis of the estimated atmospheric wind speeds and wind directions of the individual atmospheric layers (Step S109).

The phase distribution predicting unit 25 outputs a prediction result to the control unit 26. The control unit 26 derives a wave-front distortion pattern for compensating for a phase distribution included in the prediction result on the basis of the prediction result. The control unit 26 performs wave-front distortion compensation control by controlling an operation of phase modulation by the wave-front control device 23 depending on the derived wave-front distortion pattern (Step S110). Consequently, it is possible to compensate for a wave-front distortion of an optical signal input to the wave-front control device 23. The optical reception unit 24 receives an optical signal obtained by performing compensation for the wave-front distortion (Step S111).

Figure 5A:
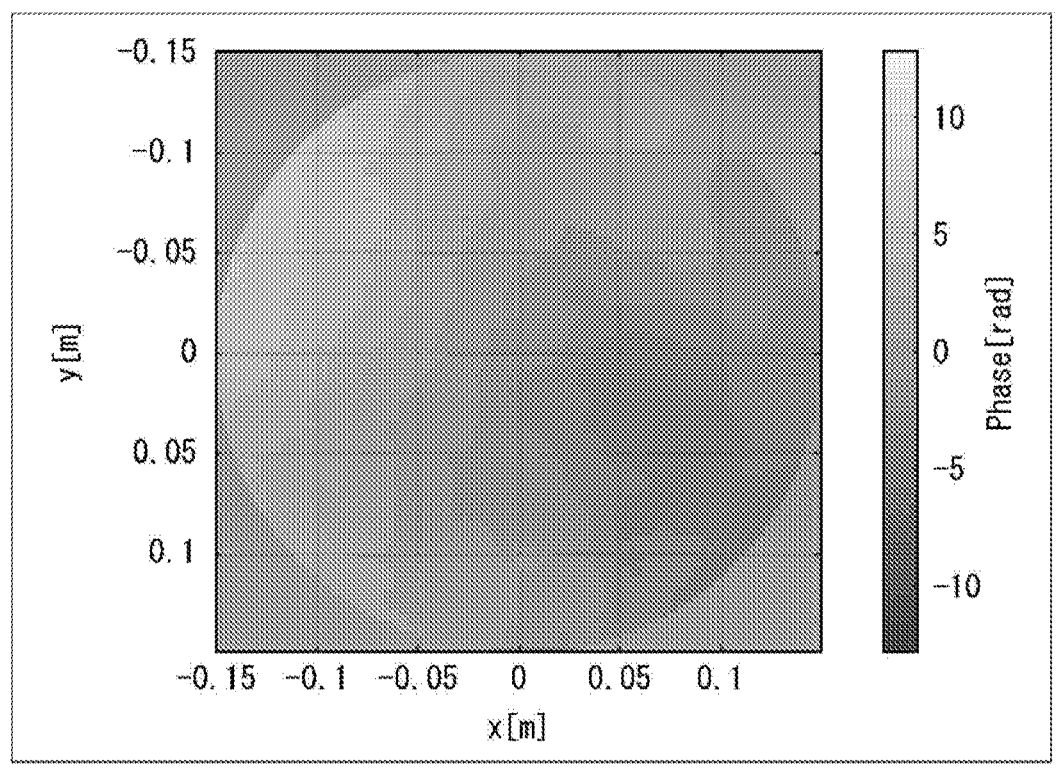
FIG. 5A is a diagram illustrating a phase distribution to which a phase change due to the atmosphere of the first layer is applied for simulation.
Figure 5B:
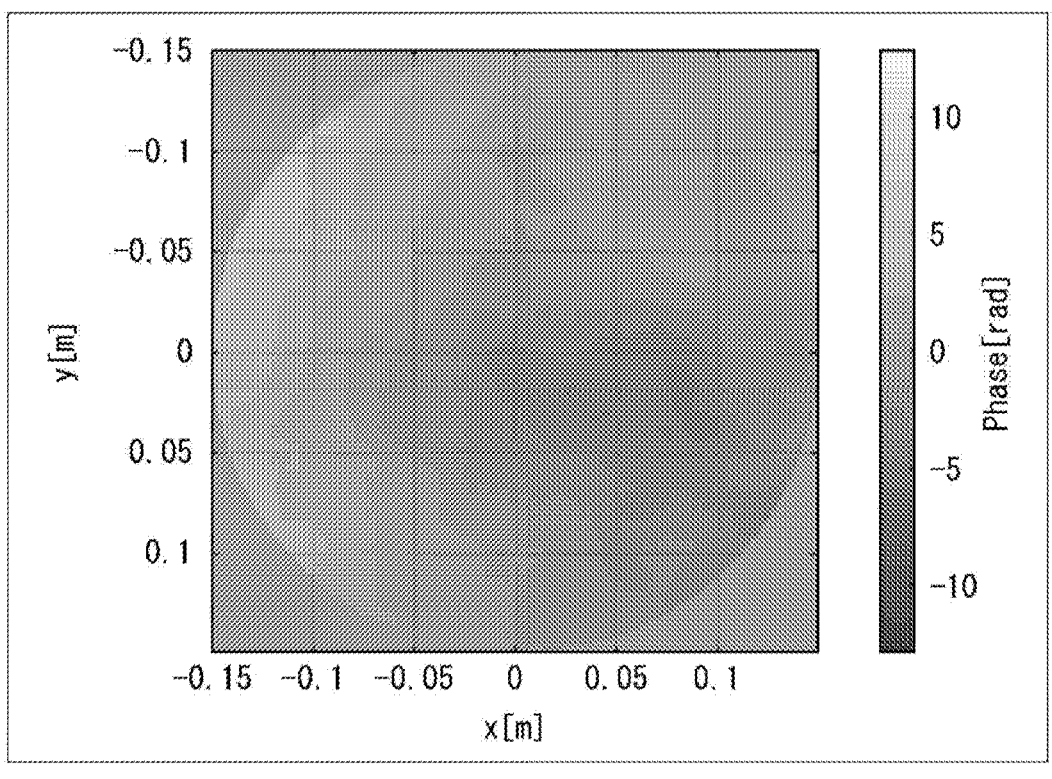
FIG. 5B is a diagram illustrating an estimation result of the phase distribution by the atmosphere of the first layer.

Next, FIGS. 5 and 6 illustrate results of performing estimation simulation of a spatial distribution of a phase change received in the individual atmospheric layers by using the above-described method. FIG. 5A is a diagram illustrating a phase distribution to which a phase change due to the atmosphere of the first layer is applied for simulation, and FIG. 5B is a diagram illustrating an estimation result of the phase distribution (for example, phase distribution $\phi\_atm1'(x, y)$) due to the atmosphere of the first layer. FIGS. 6(A), 6(B), and 6(C) are diagrams illustrating phase distributions to which other phase changes due to the atmosphere of the second layer is applied for simulation, and FIGS. 6(D), 6(E), and 6(F) are diagrams illustrating estimation results of the phase distribution by the atmosphere of the second layer.

Figure 6A:
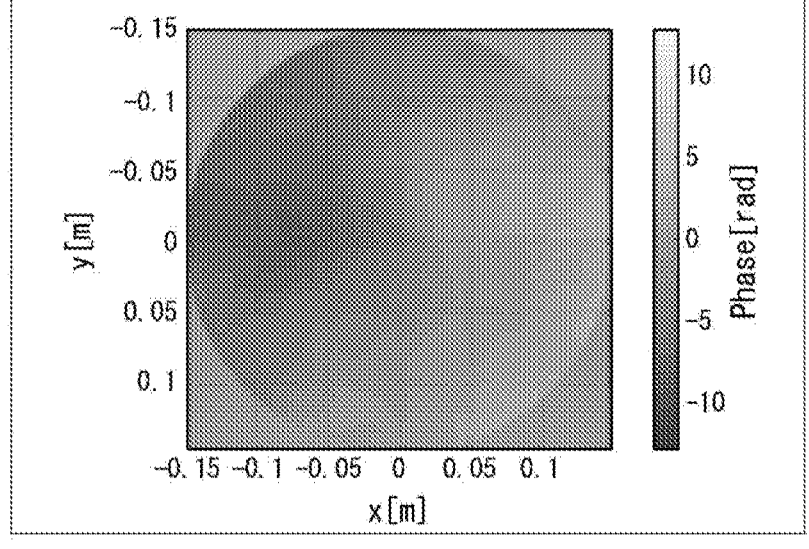
FIG. 6A is a diagram illustrating a phase distribution to which another phase change due to the atmosphere of a second layer is applied for simulation.
Figure 6B:
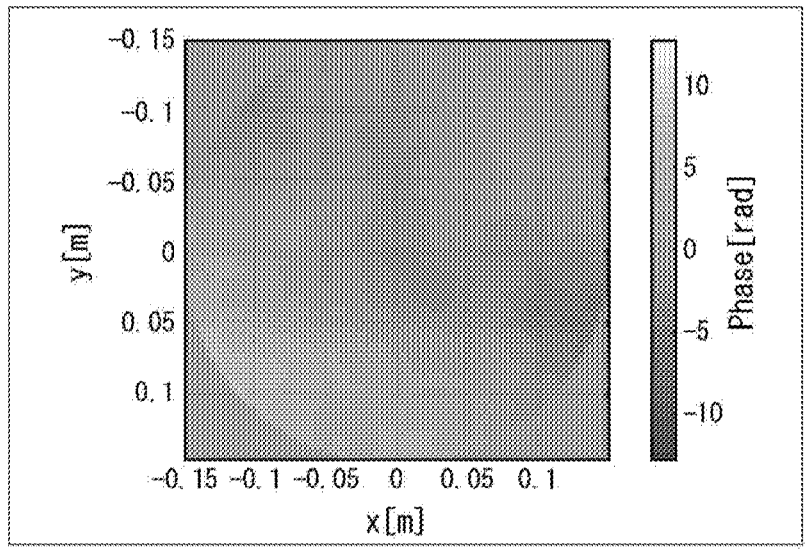
FIG. 6B is a diagram illustrating a phase distribution to which still another phase change due to the atmosphere of the second layer is applied for simulation.
Figure 6C:
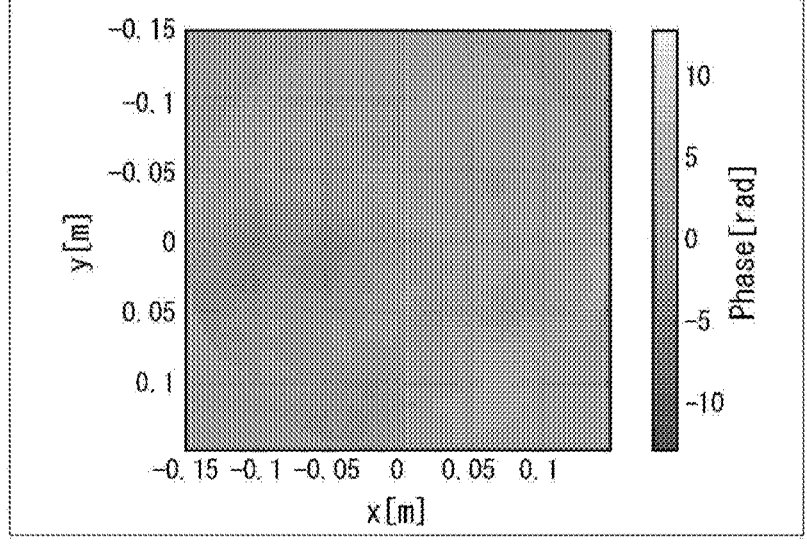
FIG. 6C is a diagram illustrating a phase distribution to which still another phase change due to the atmosphere of the second layer is applied for simulation.
Figure 6D:
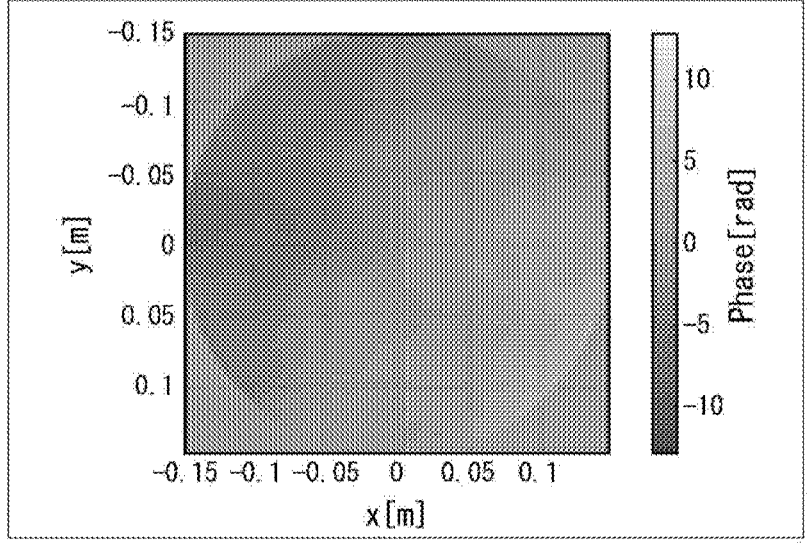
FIG. 6D is a diagram illustrating an estimation result of the phase distribution by the atmosphere of the second layer.

More specifically, FIG. 6(A) illustrates, for simulation, a phase distribution to which different phase changes due to the atmosphere of the atmospheric layer 2 (second layer) passing through the path from the optical transmission device 10 to the sensor 21-1 of the optical reception device 20 are applied, and FIG. 6(D) illustrates an estimation result (for example, the phase distribution $\phi\_atm2,1'(x, y)$) of the phase distribution of FIG. 6(A).

Figure 6E:
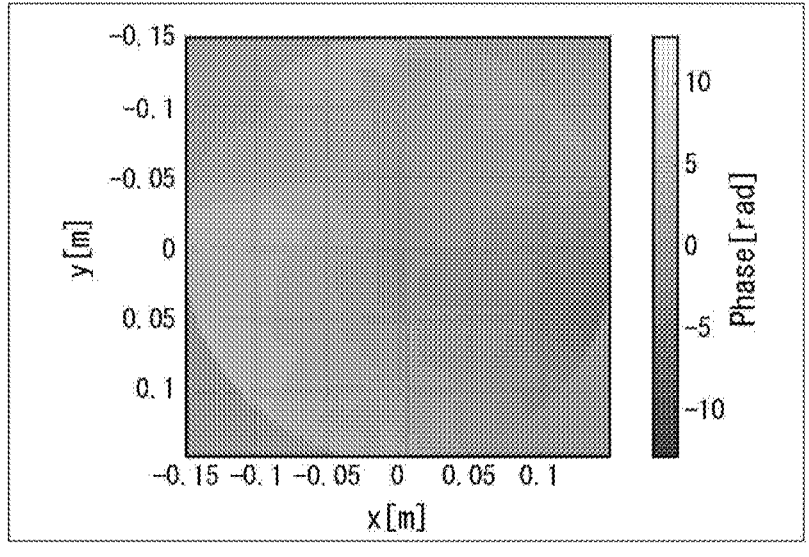
FIG. 6E is a diagram illustrating another estimation result of the phase distribution by the atmosphere of the second layer.

FIG. 6(B) illustrates, for simulation, a phase distribution to which different phase changes due to the atmosphere of the atmospheric layer 2 (second layer) passing through the path from the optical transmission device 10 to the sensor 21-2 of the optical reception device 20 are applied, and FIG. 6(E) illustrates an estimation result (for example, the phase distribution $\phi\_atm2,2'(x, y)$) of the phase distribution of FIG. 6(B).

Figure 6F:
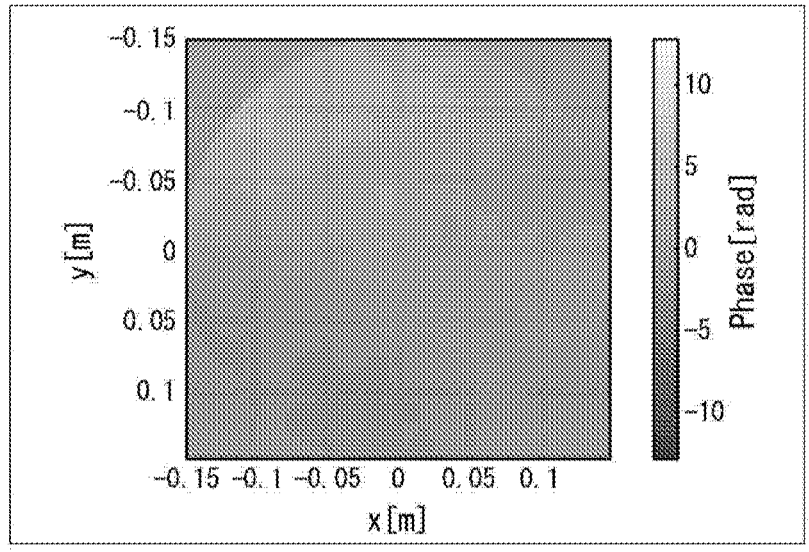
FIG. 6F is a diagram illustrating still another estimation result of the phase distribution by the atmosphere of the second layer.

FIG. 6(C) illustrates, for simulation, a phase distribution to which different phase changes due to the atmosphere of the atmospheric layer 2 (second layer) passing through the path from the optical transmission device 10 to the sensor 21-3 of the optical reception device 20 are applied, and FIG. 6(F) illustrates an estimation result (for example, the phase distribution $\phi\_atm2,3'(x, y)$) of the phase distribution of FIG. 6(C).

As illustrated in FIGS. 5(B) and 6(D) to 6(F), it can be found that the phase distribution is accurately estimated.

According to the communication system 100 configured as described above, it is possible to improve the accuracy of compensation for the wave-front distortion of the optical signal propagated in the atmosphere. Specifically, the optical transmission device 10 transmits the reference optical signal to the optical reception device 20, and the optical reception device 20 estimates the phase distributions of the individual atmospheric layers between the optical transmission device 10 and the optical reception device 20 at a time point before the wave-front distortion compensation time point tn' on the basis of the reference optical signal. The optical reception device 20 estimates the atmospheric wind directions and wind speeds of the individual atmospheric layers on the basis of the estimated values of the estimated phase distributions of the individual atmospheric layers at individual time points (for example, time point tn−1 or tn), and predicts a phase distribution of the atmosphere at the wave-front distortion compensation time point tn' from the estimation result. Accordingly, the optical reception device 20 controls the wave-front control device 23 in advance to compensate for the predicted phase distribution. Consequently, it is not necessary to control the wave-front control device 23 from the wave-front distortion compensation time point tn'. As described above, since the control delay can be suppressed, it is possible to follow variations in atmospheric fluctuations. Therefore, it is possible to improve the accuracy of compensation for the wave-front distortion of the optical signal propagated in the atmosphere.

Modification Example of First Embodiment

In the above-described embodiment, the operation in a case where the wave-front control device 23 is a spatial optical phase modulator has been described. Hereinafter, an operation in a case where the wave-front control device 23 is a deformable mirror will be described. In the case where the wave-front control device 23 is the deformable mirror, the wave-front control device 23 forms, under the control of the control unit 26, a wave-front distortion compensation pattern for compensating for the wave-front distortion of the input optical signal and compensates for the wave-front distortion of the optical signal.

Second Embodiment

The second embodiment differs from the first embodiment in that an optical transmission device compensates for a distortion generated at a wave front of an optical signal after transmission, before transmission of the optical signal. In the second embodiment, differences from the first embodiment will be mainly described.

Figure 7:
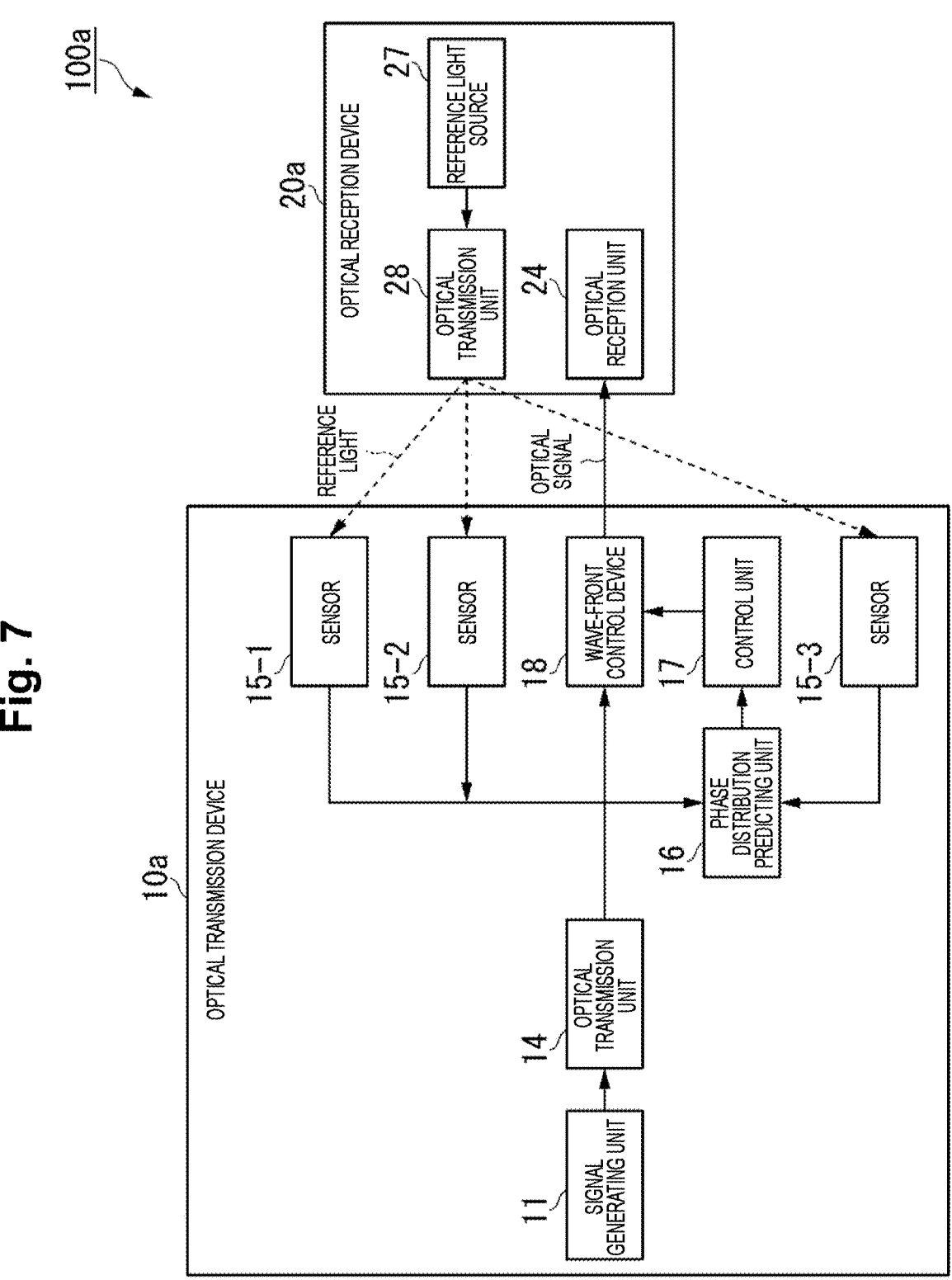
FIG. 7 is a diagram illustrating a configuration example of a communication system according to a second embodiment.

FIG. 7 is a diagram illustrating a configuration example of a communication system 100a in the second embodiment. The communication system 100a includes one or more optical transmission devices 10a and one or more optical reception devices 20a. In the communication system 100a, an optical signal transmitted from the optical transmission device 10a propagates toward the optical reception device 20a in the atmosphere between the optical transmission device 10a and the optical reception device 20a. In the communication system 100a, a reference optical signal transmitted from the optical reception device 20a propagates toward the optical transmission device 10a in the atmosphere between the optical transmission device 10a and the optical reception device 20a. In the second embodiment, the optical transmission device 10a compensates for a distortion generated at a wave front of the optical signal propagated in the atmosphere by adaptive optics. Moreover, in the second embodiment, it is assumed that there are two atmospheric layers between the optical transmission device 10a and the optical reception device 20a.

The optical transmission device 10a includes a signal generating unit 11, an optical transmission unit (optical transmitter)_14, a plurality of sensors 15-1 to 15-3, a phase distribution predicting unit (phase distribution predictor) 16, a control unit (controller) 17, and a wave-front control device 18. The optical reception device 20a includes an optical reception unit 24, a reference light source 27, and an optical transmission unit 28.

The sensors 15-1 to 15-3 are wave-front sensors. The sensors 15-1 to 15-3 are arranged at different positions and detect wave-front distortions of an incoming reference optical signal by observing a wave front (spatial phase distribution) of the reference optical signal. The sensors 15-1 to 15-3 output signals indicating the wave-front distortions of the reference optical signal to the phase distribution predicting unit 16.

The phase distribution predicting unit 16 predicts the phase distribution of the atmosphere in the individual atmospheric layers (atmospheric layer 1 and atmospheric layer 2) at the wave-front distortion compensation time point tn' on the basis of signals indicating the wave-front distortions of the reference optical signals obtained from the sensors 15-1 to 15-3, respectively. The phase distribution predicting unit 16 outputs prediction results of the phase distributions of the atmosphere in the individual atmospheric layers (the atmospheric layer 1 and the atmospheric layer 2) at the wave-front distortion compensation time point tn' to the control unit 17.

The control unit 17 derives a wave-front distortion pattern for compensating for the phase distribution included in the prediction results on the basis of the prediction results output from the phase distribution predicting unit 16. The control unit 17 controls an operation of phase modulation by the wave-front control device 18 depending on the derived wave-front distortion pattern.

The wave-front control device 18 compensates for a wave-front distortion of the optical signal depending on data to be transmitted. The wave-front control device 18 is, for example, a spatial optical phase modulator or a deformable mirror. In the following description, it is assumed that the wave-front control device 18 is a spatial optical phase modulator as an example. The wave-front control device 18 modulates a phase of a wave front of the optical signal transmitted by the optical transmission unit 14. Under the control of the control unit 17, the wave-front control device 18 forms a wave-front distortion compensation pattern for compensating for the wave-front distortion of the input optical signal and compensates for the wave-front distortion by modulating the phase of the wave front of the optical signal.

The reference light source 27 outputs a reference optical signal having a predetermined wavelength used for wave-front observation. The predetermined wavelength is a wavelength different from a wavelength of the optical signal transmitted by the optical transmission device 10a.

The optical transmission unit 28 transmits the reference optical signal output from the reference light source 27 to the optical transmission device 10a. In FIG. 7, for convenience of description, a reference optical signal transmitted from the optical transmission unit 28 to the sensor 15-2 and an optical signal transmitted from the wave-front control device 18 to the optical reception unit 24 are illustrated as being propagated on different optical axes; however, the reference optical signal and the optical signal are actually propagated on the same optical axis. Moreover, the optical transmission unit 28 transmits the reference optical signal having a beam diameter of a size to the extent that the reference optical signals can be received by at least the plurality of sensors 15 included in the optical transmission device 10*a*.

FIG. 8 is a sequence diagram illustrating a flow of processing of the communication system 100*a* according to the second embodiment. Moreover, it is assumed that the wave-front control device 18 does not perform phase adjustment by the control unit 17 at the start of the processing in FIG. 8.

The reference light source 27 of the optical reception device 20*a* generates a reference optical signal (Step S201). The reference light source 27 outputs the generated reference optical signal to the optical transmission unit 28. The optical transmission unit 28 transmits the reference optical signal to the optical transmission device 10*a* (Step S202). Moreover, the optical reception device 20*a* continually transmits the reference optical signals to the optical transmission device 10*a*. The reference optical signals transmitted from the optical reception device 20*a* are received by the individual sensors 15-1 to 15-3 of the optical transmission device 10*a*.

Each of the sensors 15-1 to 15-3 observes a wave front (spatial phase distribution) of the reference optical signal at the time point tn−1 (Step S203). Consequently, each of the sensors 15-1 to 15-3 detects a wave-front distortion of the reference optical signal at the time point tn−1. Here, phase distributions $\phi1(x, y)$, $\phi2(x, y)$, and $\phi3(x, y)$ observed by the respective sensors 15-1 to 15-3 are expressed by Expression (1) above. In this case, the phase distribution $\phi1(x, y)$ represents a phase distribution observed by the sensor 15-1, the phase distribution $\phi2(x, y)$ represents a phase distribution observed by the sensor 15-2, and the phase distribution $\phi3(x, y)$ represents a phase distribution observed by the sensor 15-3.

In the case of the second embodiment, in Expression (1), $\phi\_atm1(x, y)$ represents a phase distribution of the atmospheric layer 1 (first layer) passing through a path from the optical reception device 20*a* to the optical transmission device 10*a*, $\phi\_atm2,1(x, y)$ represents a phase distribution of the atmospheric layer 2 (second layer) passing through a path from the optical reception device 20*a* to the sensor 15-1 of the optical transmission device 10*a*, $\phi\_atm2,2(x, y)$ represents a phase distribution of the atmospheric layer 2 (second layer) passing through a path from the optical reception device 20*a* to the sensor 15-2 of the optical transmission device 10*a*, and $\phi\_atm2,3(x, y)$ represents a phase distribution of the atmospheric layer 2 (second layer) passing through a path from the optical reception device 20*a* to the sensor 15-3 of the optical transmission device 10*a*. Further, in the case of the second embodiment, $ni(x, y)$ (i is an integer of 1 or more) in Expression (1) represents a wave-front observation error in each of the sensors 15-1 to 15-3.

Each of the sensors 15-1 to 15-3 outputs a signal indicating the wave-front distortion of the reference optical signal to the phase distribution predicting unit 16. The phase distribution predicting unit 16 estimates atmospheric phase distributions of the individual atmospheric layers at the time point tn−1 on the basis of the signals indicating the wave-front distortions of the reference optical signals obtained from the individual sensors 15-1 to 15-3 (Step S204). First, a method of estimating the phase distributions of the atmosphere of the individual atmospheric layers by the phase distribution predicting unit 16 will not be described since the method is similar to the method of the first embodiment.

Thereafter, each of the sensors 15-1 to 15-3 observes a wave front (spatial phase distribution) of the reference optical signal at the time point tn (Step S205). Consequently, each of the sensors 15-1 to 15-3 detects a wave-front distortion of the reference optical signal at the time point tn. Each of the sensors 15-1 to 15-3 outputs a signal indicating the wave-front distortion of the reference optical signal to the phase distribution predicting unit 16.

The phase distribution predicting unit 16 estimates atmospheric phase distributions of the individual atmospheric layers at the time point tn on the basis of the signals indicating the wave-front distortions of the reference optical signals obtained from the individual sensors 15-1 to 15-3 (Step S206). A method of deriving the atmospheric phase distribution of the individual atmospheric layers at the time point tn is similar to that in Step S204. Consequently, the phase distribution predicting unit 16 can obtain the time-point tn−1 estimated value and the time-point tn estimated value.

The phase distribution predicting unit 16 estimates atmospheric wind speeds and wind directions of the individual atmospheric layers through correlation calculation between the time-point tn−1 estimated values and the time-point tn estimated values (Step S207). Consequently, the phase distribution predicting unit 16 estimates a direction and a speed in and at which the atmosphere is moving for each layer, using the time-point tn−1 estimated value and the time-point tn estimated value. Accordingly, the phase distribution predicting unit 16 predicts the atmospheric phase distributions of the individual atmospheric layers at the wave-front distortion compensation time point tn' on the basis of the estimated atmospheric wind speeds and wind directions of the individual atmospheric layers (Step S208).

The phase distribution predicting unit 16 outputs a prediction result to the control unit 17. The control unit 17 derives a wave-front distortion pattern for compensating for a phase distribution included in the prediction result, on the basis of the prediction result. The control unit 17 performs wave-front distortion compensation control by controlling an operation of phase modulation by the wave-front control device 18 depending on the derived wave-front distortion pattern (Step S209). Consequently, it is possible to compensate for a wave-front distortion of an optical signal input to the wave-front control device 18.

The signal generating unit 11 generates an optical signal (Step S210). The signal generating unit 11 outputs the generated optical signal to the optical transmission unit 14. The optical transmission unit 14 transmits the optical signal to the optical reception device 20*a* via the wave-front control device 18 (Step S211). The optical signal transmitted from the optical transmission unit 14 is compensated for the wave-front distortion in advance by the wave-front control device 18 and reaches the optical reception unit 24 of the optical reception device 20*a*. The optical reception unit 24 receives an optical signal obtained by performing compensation for the wave-front distortion (Step S212).

According to the communication system 100*a* configured as described above, the optical reception device 20*a* transmits the reference optical signal to the optical transmission device 10*a*, and the optical transmission device 10*a* compensates for a distortion generated at the wave front of the transmitted optical signal, before transmission of the optical signal on the basis of the reference optical signal. Consequently, it is not necessary to control the wave-front control device 18 from the wave-front distortion compensation time point tn'. As described above, since the control delay can be suppressed, it is possible to follow variations in atmospheric fluctuations. Therefore, it is possible to improve the accuracy of compensation for the wave-front distortion of the optical signal propagated in the atmosphere.

Modification Example of Second Embodiment

In the above-described embodiment, the operation in a case where the wave-front control device 18 is a spatial optical phase modulator has been described. Hereinafter, an operation in a case where the wave-front control device 18 is a deformable mirror will be described. In the case where the wave-front control device 18 is the deformable mirror, the wave-front control device 18 forms, under the control of the control unit 17, a wave-front distortion compensation pattern for compensating for the wave-front distortion of the input optical signal and compensates for the wave-front distortion of the optical signal.

Modification Example Common to First Embodiment and Second Embodiment

In the first embodiment, the three sensors 21 are included in the optical reception device 20, and in the second embodiment, an example in which the three sensors 15 are included in the optical transmission device 10a has been described. The number of the sensors 21 and the number of the sensors 15 may be four or more. In this case, the beam diameter of the reference optical signal is controlled to be a size that can be received by four or more sensors.

Some or all of processes performed by the optical transmission device 10 or 10a and the optical reception device 20 or 20a in the above-described embodiments may be implemented by a computer. In this case, a program for implementing the functions may be recorded in a computer-readable recording medium, and the program recorded in the recording medium may be read and executed by a computer system to implement the functions. Moreover, the "computer system" mentioned herein includes an OS and hardware such as peripheral devices. In addition, the "computer-readable recording medium" refers to a portable medium such as a flexible disk, a magneto-optical disc, a ROM, or a CD-ROM or a storage device such as a hard disk included in the computer system.

Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. In addition, the above-described program may be for implementing some of the functions described above, may be implemented in a combination of the functions described above and a program already recorded in a computer system, or may be implemented using a programmable logic device such as a field programmable gate array (FPGA).

Although the embodiments of the present invention have been described in detail with reference to the drawings, specific configurations are not limited to the embodiments and include design and the like within the scope of the present invention without departing from the gist of the present invention.

INDUSTRIAL APPLICABILITY

The present invention is applicable to an optical communication system that performs wireless communication using an optical signal.

REFERENCE SIGNS LIST

10, 10a Optical transmission device
20, 20a Optical reception device

11 Signal generating unit
12 Reference light source
13 Beam splitter
14 Optical transmission unit
15-1 to 15-3 Sensor
16 Phase distribution predicting unit
17 Control unit
18 Wave-front control device
21-1 to 21-3 Sensor
22 Beam splitter
23 Wave-front control device
24 Optical reception unit
25 Phase distribution predicting unit
26 Control unit
27 Reference light source
28 Optical transmission unit

The invention claimed is:

1. A communication method in a communication system including an optical transmission device and an optical reception device, the communication method comprising:

detecting wave-front distortions of a reference optical signal used for wave-front observation which arrives at a first time point and a second time point before a compensation start time point at which compensation for wave-front distortion is performed, by a plurality of sensors;

estimating spatial phase distributions of a plurality of atmospheric layers between the optical transmission device and the optical reception device, respectively, at the first time point and the second time point, based on the wave-front distortions detected by the plurality of sensors, respectively;

predicting the respective spatial phase distributions of the plurality of atmospheric layers at the compensation start time point by using estimation results of the respective spatial phase distributions of the plurality of atmospheric layers estimated at the first time point and the second time point;

controlling, based on the predicted results, an operation performed by a wave-front control device that compensates for a wave-front distortion of an optical signal; and receiving the wave-front distortion of the optical signal transmitted from the optical transmission device after the wave-front control device compensates for the wave-front distortion.

2. The communication method according to claim 1, wherein the reference optical signal having a larger beam diameter than an optical signal is transmitted to be received by the plurality of sensors.

3. The communication method according to claim 1, wherein the plurality of atmospheric layers includes two layers, spatial phase distributions of an atmosphere of a first layer at the first time point and the second time point are estimated by averaging the spatial phase distributions indicating the respective wave-front distortions detected by the plurality of sensors, spatial phase distributions of an atmosphere of a second layer at the first time point and the second time point are estimated by subtracting an estimated value of the spatial phase distributions of the atmosphere of the first layer from the spatial phase distributions indicating the respective wave-front distortions detected by the plurality of sensors, atmospheric wind speeds and wind directions of individual atmospheric layers are estimated based on the estimated value of the spatial phase distributions of the atmosphere of the first layer and an estimated value of the spatial phase distributions of the atmosphere of the second layer at the first time point and the second time point, respectively, and the respective spatial phase distributions of the plurality of atmospheric layers at the compensation start time point are predicted based on the atmospheric wind speeds and wind directions of the individual atmospheric layers at the first time point and the atmospheric wind speeds and wind directions of the individual atmospheric layers at the second time point.

4. The communication method according to claim 3, wherein the atmospheric wind speeds and wind directions of the individual atmospheric layers are estimated through correlation calculation of estimation results of spatial phase distributions of individual atmospheric layers at the first time point and the second time point.

5. An optical reception device in a communication system including an optical transmission device and the optical reception device, the optical reception device comprising:

a plurality of sensors that detect wave-front distortions of a reference optical signal used for wave-front observation which arrives at a first time point and a second time point before a compensation start time point at which compensation for wave-front distortion is performed;

a phase distribution predictor configured to estimate spatial phase distributions of a plurality of atmospheric layers between the optical transmission device and the optical reception device, respectively, at a first time point and a second time point, based on the respective wave-front distortions detected by the plurality of sensors, and predicts the respective spatial phase distributions of the plurality of atmospheric layers at the compensation start time point by using an estimation result of the respective spatial phase distributions of the plurality of atmospheric layers estimated at the first time point and second time point;

a wave-front control device configured to compensate for a wave-front distortion of an optical signal transmitted from the optical transmission device;

a controller configured to control an operation performed by the wave-front control device, based on a predicted result; and an optical receiver configured to receive an optical signal obtained by performing compensation for a wave-front distortion of the optical signal by the wave-front control device.

6. An optical transmission device in a communication system including the optical transmission device and an optical reception device, the optical transmission device comprising:

a plurality of sensors that detect wave-front distortions of a reference optical signal used for wave-front observation which arrives at a first time point and a second time point before a compensation start time point at which compensation for wave-front distortion is performed;

a phase distribution predictor configured to estimate spatial phase distributions of a plurality of atmospheric layers between the optical transmission device and the optical reception device, respectively, at a first time point and a second time point, based on the respective wave-front distortions detected by the plurality of sensors, and predicts the respective spatial phase distributions of the plurality of atmospheric layers at the compensation start time point by using an estimation result of the respective spatial phase distributions of the plurality of atmospheric layers estimated at the first time point and second time point;

a wave-front control device configured to compensate for a wave-front distortion of an optical signal depending on data to be transmitted;

a controller configured to control an operation performed by the wave-front control device, based on a predicted result; and an optical transmitter configured to transmit an optical signal obtained by performing compensation for a wave-front distortion via the wave-front control device to the optical reception device.

* * * * *